UNITED STATES PATENT OFFICE.

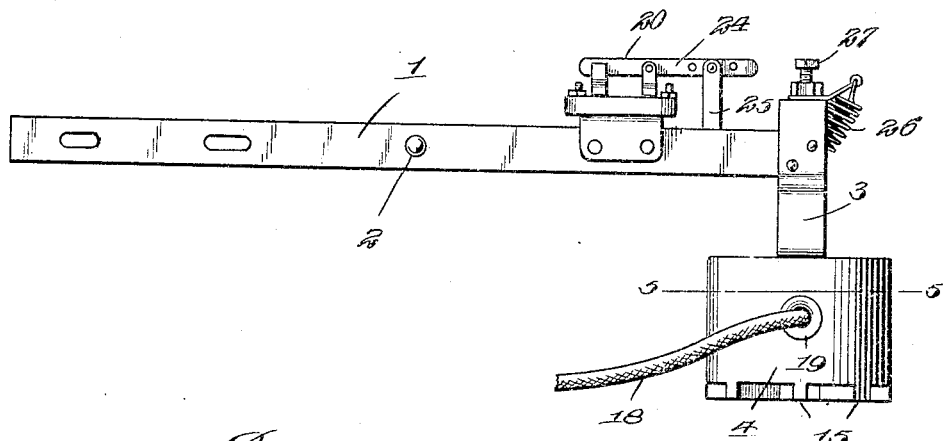

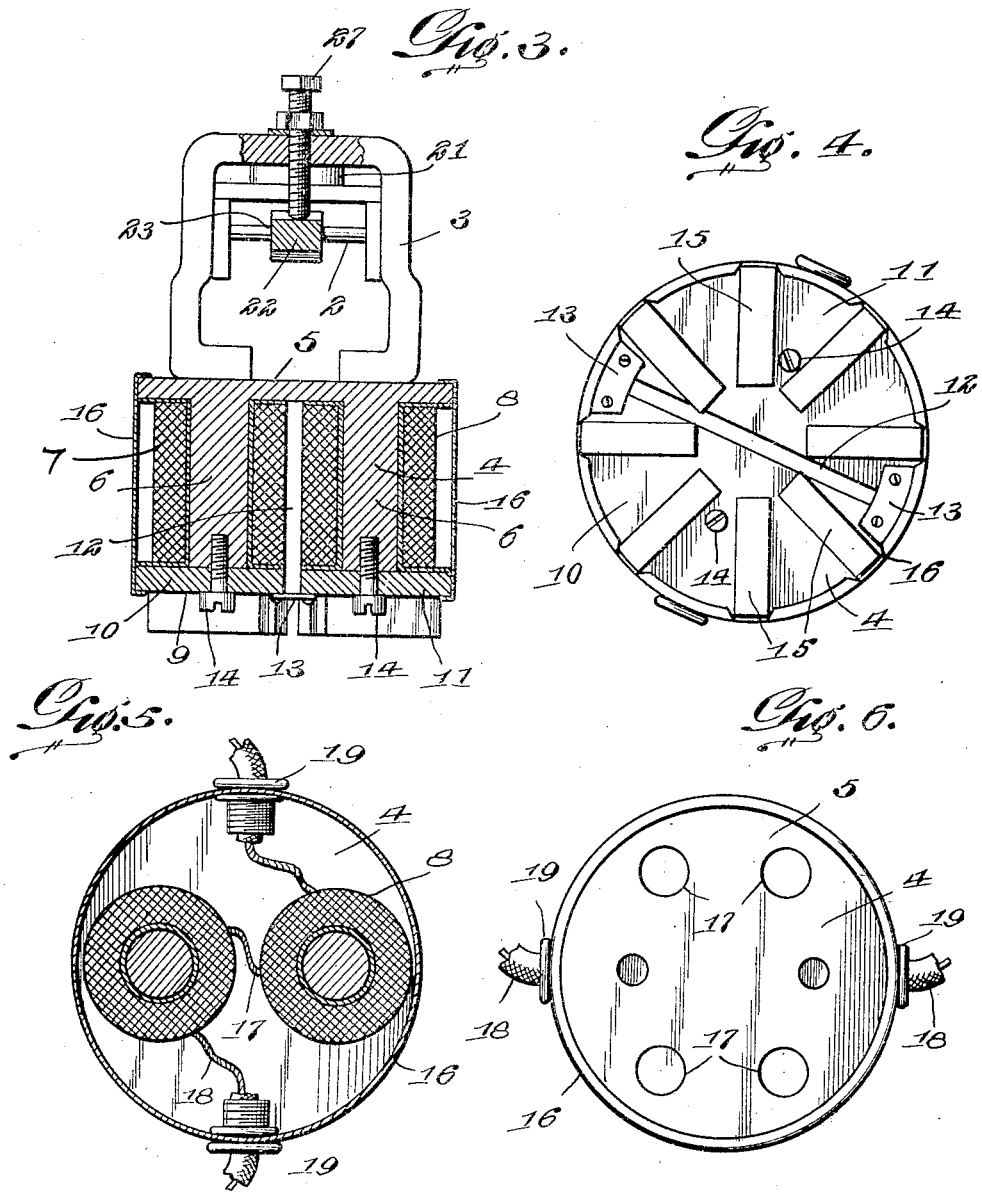

RUSSELL BRYAN POTTORFF, OF WAYNESBORO, PENNSYLVANIA.

TRANSFER DEVICE FOR FRUIT-JAR MACHINES.

1,336,317. Specification of Letters Patent. Patented Apr. 6, 1920.

Application filed May 24, 1919. Serial No. 299,471.

*To all whom it may concern:*

Be it known that I, RUSSELL B. POTTORFF, a citizen of the United States, residing at Waynesboro, in the county of Franklin and State of Pennsylvania, have invented new and useful Improvements in Transfer Devices for Fruit-Jar Machines, of which the following is a specification.

This invention relates to an improvement in the transferring means of glass jar making machines and the principal object of the invention is to provide electromagnetic means for engaging the ring carrying the mold for moving it from one table to the other.

Another object of the invention is to provide automatic means for interrupting the circuit as soon as the ring and mold reach the blow table.

Still another object of the invention is to provide means for preventing the heat from injuring or interfering with the proper working of the electromagnetic means.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a transfer arm provided with my invention;

Fig. 2 is a longitudinal section thereof;

Fig. 3 is an end view with parts in section;

Fig. 4 is a bottom view of the electromagnet;

Fig. 5 is a section on line 5—5 of Fig. 1;

Fig. 6 is a top view of the electromagnet.

In the operation of forming glass fruit jars the iron ring with the glass attached thereto, is transferred from the press table to the blow table where the jars are formed by the blowing apparatus. This transferring means consists of an arm provided with hooks for engaging the iron rings and which is oscillated from one table to the other and given a vertical movement to place the ring with the glass attached thereto, in the blow molds.

It is the object of my invention to replace these hooks by the electromagnet which will engage the ring to move it from one table to the other and to also provide means to break the circuit to the electromagnet when the ring is over the blow mold on the blow table so that the ring will be released from the electromagnet.

In the drawings the transfer arm is indicated at 1 and this arm consists of the two bars spaced apart and connected together by the bolts 2. The outer end of the arm carries the yoke member 3 to which the electromagnet 4 is attached. The electromagnet is formed in the following manner: The top plate or yoke 5 has the two cores 6 formed therewith and these cores project downwardly, as shown. The winding 7 of each core is wrapped with asbestos, as shown at 8 so as to protect the wire from the heat. The bottom plate 9 is formed of two pieces 10 and 11 which are of semicircular form and these two parts are spaced apart to provide an air gap 12. The parts are connected together by the copper plates 13 which bridge the air gap. These two parts of the bottom plate are connected with the iron cores by the bolts 14. Lugs 15 are connected with the bottom of the iron plate so as to space the iron ring from the magnets to prevent injury to the coils by the heat from the ring. The windings are inclosed by a copper casing 16 which has its edges connected with the upper and lower plates, as shown. The upper plate is provided with the openings 17 for admitting air to the interior of the device. As shown, the cores and windings are located on each side of the center of the device and the windings are connected together by the wire 17 and the circuit wires 18 pass through the bushings 19 located in opposite sides of the casing. One of these wires is connected with the switch 20 which is located on the arm 1 and is carried by the base 21 secured to the arm. This switch is automatically operated when the arm reaches the blow table, by means of a rod 22 pivoted at 23 to the arm and this rod is connected with the switch lever 24 by the link 25. A spring 26 normally holds the parts with the switch in closed position. This spring may be adjusted by means of the set screw 27 carried by the yoke 3. When the arm 1 is in position to drop the iron ring onto the blow mold, the rod 22 will strike a set screw 28 located on the stationary part of the machine so that the outer end of said rod will be depressed so that the link 25 will raise the switch 24 and thus break the circuit to the electromagnet and cause the iron ring to drop from the lugs.

It will thus be seen that the ring will be gripped by the electromagnetic means at one table and will be carried thereby, when the arm is moved, to the other table and as soon as it is in position over the blow mold the set screw 28 striking the rod 22, will cause the switch to move into inoperative position and thus break the circuit to the electromagnet so that the ring is released and is placed in position on the blow mold.

The lugs on the bottom plate of the electromagnet and the asbestos covering for the coils as well as the ventilating means, prevents the heat from injuring the said electromagnet means.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with the transfer arm of a glass jar-forming apparatus, of electromagnetic means carried by said arm for engaging the iron ring of the mold and means for automatically breaking the circuit to the electromagnetic means when the arm reaches the blow table.

2. In combination with the transfer arm of a glass jar-forming apparatus, of an electromagnet connected with said arm and lugs connected to the bottom of said electromagnetic means for spacing the iron ring of the mold from said bottom.

3. In combination with the transfer arm of a glass jar-forming apparatus, of an electromagnet connected with said arm and consisting of a top plate having perforations therein, cores depending from said plate, asbestos-covered windings for said cores, a bottom plate consisting of two parts each of which is connected to a core, said parts being spaced apart to form an air gap and lugs to said parts.

4. In combination with a transfer arm of a glass jar-forming apparatus, an electromagnet carried by said arm and consisting of a top perforated plate, cores depending therefrom, asbestos covered windings for said cores, a bottom plate consisting of two parts, each of which is connected with a core, said two parts being spaced apart to form an air gap, copper plates connecting said parts together and bridging the gap, lugs on said bottom plate and a top casing inclosing the parts and having its edges connected with the top and bottom plates.

5. In combination with the transfer arm of a glass jar-forming apparatus, an electromagnet carried by said arm, a switch for said electromagnet supported by said arm, an operating rod for said switch, a link connecting the switch with the arm, a stationary part adapted to contact with the rod for causing the same to throw the switch into inoperative position and means for adjusting the said rod.

In testimony whereof I affix my signature.

RUSSELL BRYAN POTTORFF.